WRAP-AROUND REEL CASE

Filed March 15, 1965

INVENTOR
GEORGE F. LYMAN
GREGORY MATHUS
BY, Wolf, Greenfield & Hieken
ATTORNEYS

United States Patent Office 3,286,829
Patented Nov. 22, 1966

3,286,829
WRAP-AROUND REEL CASE

George F. Lyman, South Hadley, Mass., and Gregory Mathus, West Hartford, Conn., assignors to Data Packaging Corp., Cambridge, Mass., a corporation of Massachusetts Filed Mar. 15, 1965, Ser. No. 439,837
4 Claims. (Cl. 206—52)

This invention relates to the storage of film and tape reels and more particularly comprises a closure for the periphery of the reel.

Conventionally, tape and film reels are stored in containers which completely enclose the reels. Ordinarily, the containers comprise a base, cover and some form of latch for locking the base and cover closed. Even the most streamlined of the containers available are approximately twice the thickness of the reel for which they are designed, and consequently, they effectively half the storage capacity of bins or shelves upon which the reels are stored.

Very recently, some effort has been made to alter the basic design of reel containers so as to reduce their size and cost as well as to eliminate other of their limitations. Many of these designs have taken the form of a band which encircles the periphery of the reel and engages the reel flange edges so as to form a closure about the reel periphery. When used on a reel having flanges free of any openings, the band cooperates with the reel to define a completely closed container for the tape or film wound about the reel.

While such bands perform their primary function of providing an enclosure for protecting the material stored on the reels when the reels have solid flanges, many of the bands which are now available are difficult to mount on the reels. In order to mount the bands on the reel flanges it is necessary to very carefully thread the edges of the reel flanges into channels provided on the bands, and thereafter the latching devices provided on the ends of the bands must be joined with care to avoid dislodging the reel flange edges from the channels. These manipulations often require more time than can reasonably be given for such an operation, and such closures are very inconvenient as compared to standard cases that require a simple manipulation to close. As a result, such bands have not met with general approval.

One important object of this invention is to provide a band-type or wrap-around reel closure which is easy to mount on and close about the periphery of a reel.

Another important object of this invention is to provide a reel closure which takes a minimum of space in storage, uses a comparatively small quantity of material in its manufacture and is capable of forming a most satisfactory seal about the reel periphery so as to provide as much protection for the tape or film stored on the reel as the more conventional forms of containers.

Yet another important object of this invention is to provide a very simple wrap-around type of closure which is inexpensive to manufacture.

To accomplish these and other objects, the closure of this invention includes among its features a cylindrical wall having a pair of longitudinal breaks therein dividing the wall into a pair of semi-circular walls. A hinge is provided at one of the breaks for joining that break and allowing the two parts to be moved from a cylinder forming position to an open position wherein the unhinged break in the wall is parted. A pair of arcuate coplanar flanges are connected to and are coextensive with one side edge of the two parts of the side wall and prevent access by a reel within the side wall from the side edge on which the flanges are mounted. Channel means are provided on the iner side of the cylindrical wall which receives the edges of the reel flanges and forms a seal about the flanges of the reel when the cylindrical wall is closed. The flanges secured to the cylindrical wall are aligned with the channel means so as to guide the reel flanges into the channel means when the reel is placed against the flange.

These and other objects and features of this invention along with its incident advantages will be better understood and appreciated from the following detailed description of one embodiment thereof selected for purposes of illustration and shown in the accompanying drawing, in which.

Figures 1, 2, 3, 4, 5:
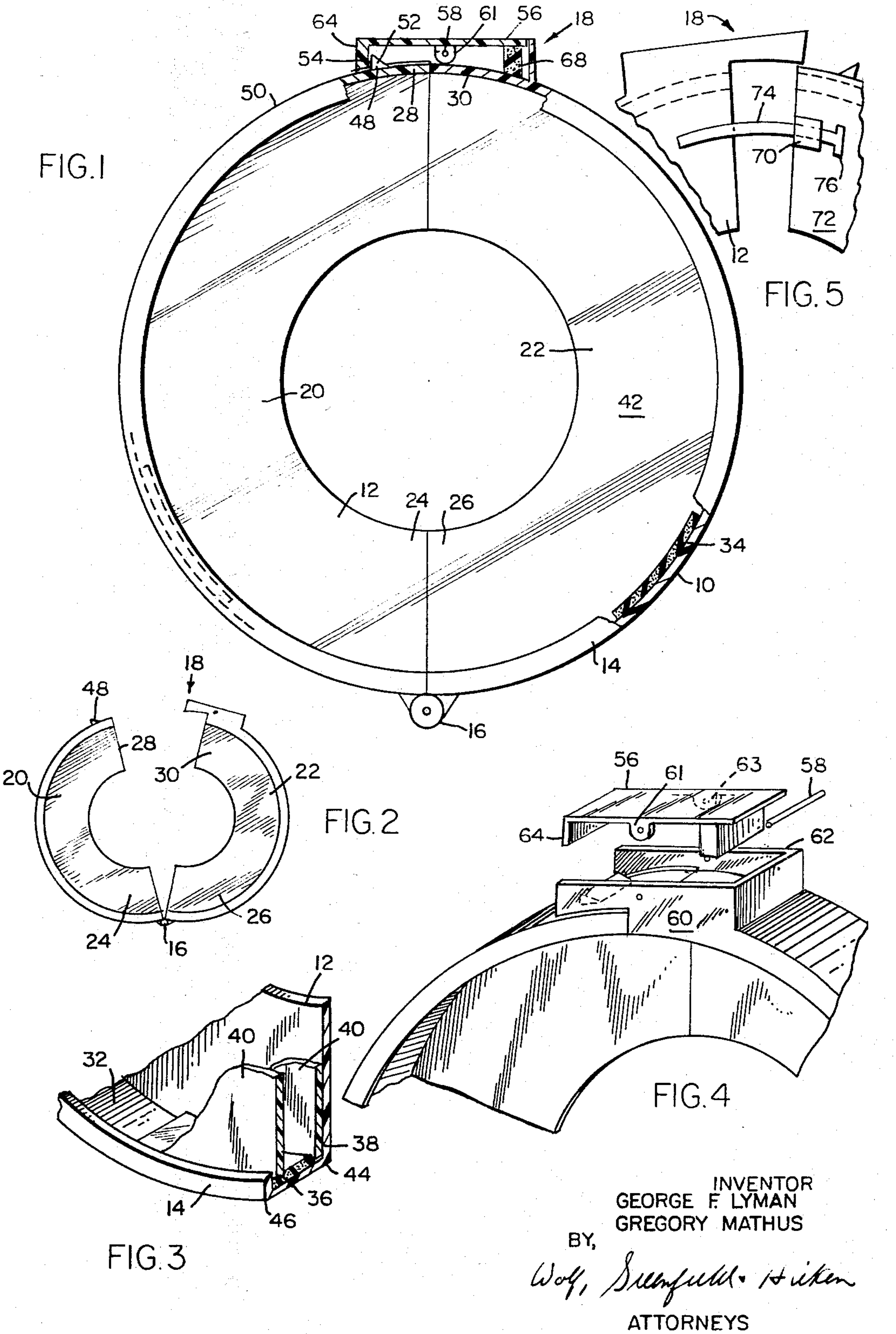
FIG. 1 is a top view partly in section of a wrap-around closure constructed in accordance with this invention and showing the closure in a closed condition.
FIG. 2 is a top view on a reduced scale of the reel closure in the open condition.
FIG. 3 is a cross-sectional perspective view of the reel closure showing the manner in which it fits on the flanges of a reel.
FIG. 4 is an exploded view of the latch of the closure.
FIG. 5 is a fragmentary view of a modification of the wrap-around closure.

The wrap-around closure shown in the drawing includes a cylindrical end wall 10, a flange 12 secured to one edge of the end wall and a short rib 14 secured to the other edge of the end wall, a hinge 16 which allows the end wall to open and close and a latch 18 which releasably holds the end wall in a closed condition.

The end wall 10, flange 12, and rib 14 are formed in two parts 20 and 22 secured together at their adjacent ends 24 and 26 by the hinge 16. Each part is generally semi-circular in form, and each part composed of the end wall section, flange section and rib section may be integrally formed. In FIG. 1 the two parts 20 and 22 are shown in their closed condition held in that condition by the latch 18. By releasing the latch the ends 28 and 30 of the sections 20 and 22, respectively, may be separated as shown in FIG. 2 to effectively increase the diameter of the end wall.

As shown in FIGS. 3 and 4, the end wall 10 with the flange 12 and rib 14 defines an inwardly facing annular channel 32 when the ends 28 and 30 of the two sections 20 and 22 are latched together. In the embodiment shown, a gasket 34 made of a rubber-like material lines the channel 32. When the closure is disposed about the periphery of a reel as illustrated in FIG. 3, the edges 36 and 38 of the reel flanges 40 bear against the gasket 34 so as to effectively seal the opening at the edge of the reel between the two reel flanges. It will be appreciated that if the reel flanges are solid as opposed to being windowed, the reel and the end wall 10 with its gasket 34 define a complete closure for the material wound upon the reel.

As is evident in FIG. 3, the width of the channel 32 is just large enough to receive the edges of the reel flanges 36 and 38. The dimensions for the channel are selected with a particular size reel in mind. Because the width of the channel just exceeds the width of the reel, when a reel is placed within the end wall 10 and abuts against the inner surface 42 of the flange 12, the edges 36 and 38 of the reel flanges are aligned with the channel 32 so that the reel closure end wall 10 may be closed about the reel. The flange 12 extends radially inwardly from the edge 44 of the end wall 10 a distance sufficient to block access of a reel to the region within the end wall even when the closure is open. Rather, access to the region within the end wall 10 is afforded from the other edge 46 of the end wall as the rib 14 is relatively short and does not extend inwardly an appreciable distance from that edge. It is evident in FIG. 2 that the reel may be placed on the flange 12 from above as shown, but that the reel cannot be introduced from below.

The latching device 18 includes a short shoulder 48 mounted on the outer surface 50 of the end wall 10 adjacent its free end 28. One side 52 of the shoulder 48 facing the end 30 of the other part 22 is inclined gradually upwardly from the surface 50, while the other side 54 of the shoulder is generally perpendicular to the surface 50. The shoulder 48 cooperates with a pivotally mounted flat plate 56 supported on a pin 58 which extends between a pair of parallel side walls 60 and 62 that form continuations of the flange 12 and the rib 14, on the outer side of the end wall. The pin 58 passes through ears 61 and 63 on the bottom of the plate adjacent its center. The plate 56 and the walls 60 and 62 are carried on the end 30 of the end wall 10, and the plate 56 extends beyond the edge as is evident in FIG. 2.

A rib 64 is mounted on the inner face of the far end 66 of the plate 56 and is adapted to cooperate with the shoulder 48 yieldably to retain the ends 28 and 30 of the closure together. A plate 56 is biased to the position shown in FIG. 1 by a rubber-like pad 68 disposed beneath the plate 56 and bearing against the upper surface 50 of the end wall 10. The pad 68 acts as a spring and may be overcome by pressing the plate 56 downwardly on the right side as viewed in FIG. 1 with reference to the pivot pin 58. When the plate 56 is so depressed, the rib 64 moves upwardly beyond the shoulder 48 so as to enable the shoulder 48 to be withdrawn from beneath the plate. In this way, the case may be opened. To close the case, the operator need only move the ends 28 and 30 of the closure toward one another. The rib 64 rides up the inclined surface 52 of the shoulder 48 until it snaps behind the perpendicular face 54 so as to releasably lock the case in the closed condition.

The plate 56 serves another function in addition to that in the latch. In FIGS. 1, 2 and 4 it will be noted that the upper surface of the plate is suitable to receive a label or other identifying device which may be used to indicate the manufacturer, tape contents, etc., and which is plainly visible when the closures are stored.

The end wall 10, flange 12 and rib 14 are preferably made of a rigid plastic material and a relatively sturdy hinge is secured to the adjacent ends 24 and 26 of the two sections so as to substantially confine movement of the ends 28 and 30 to circumferential movement with respect to one another. That is, because the material from which the case is made is relatively rigid, the ends 28 and 30 will remain in substanially the same plane and will not separate in a direction parallel to the case axis. To close a reel within the case, it is only necessary to open the latch 18 and separate the ends 28 and 30 an inch or two as shown in FIG. 2 so that the rib 14 defines an effective circle larger in diameter than the diameter of the reel flanges. When the case is so opened, the operator need only drop the reel within the end wall 10 against the inner surface 42 of the flange 12. When the reel is in that position, the edges of its flanges are aligned with the channel 32 so that the end wall 10 may be closed about the reel. When the reel is in position within the end wall, the operator need only move the two ends 28 and 30 toward one another causing the latch to close in the manner shown in FIG. 1.

Those skilled in the art will appreciate that numerous modifications may be made of the invention shown and described without departing from its spirit. For example, it may be desirable to attach some form of slide connection to the adjacent movable ends 28 and 30 of the two sections 20 and 22 of the closure so that they will not displace from one another into different planes. Such an arrangement is shown in FIG. 5. In that figure, a slot 70 is provided on the outer surface 72 of the flange 12 on the section 22, and a tongue 74 is provided on the outside of the flange 12 at the end 28 of section 20. The tongue 74 extends into the slot, and the two remain in engagement with one another even when the case is opened. A stop 76 at the end of the tongue limits the extent to which the ends 28 and 30 may be separated, but that limit exceeds the requirements necessary for loading the reel in the closure. It will be appreciated that such a tongue and slot connection of the ends 28 and 30 will retain the flange 12 in a flat condition and prevent displacement of one side with respect to the other in a direction parallel to the closure axis.

Because numerous modifications may be made of this invention without departing from its spirit, it is not intended to limit the breadth of this invention to the embodiments illustrated and described. Rather, it is intended that the scope of this invention be determined by the appended claims and their equivalents.

What is claimed is:

1. A reel closure comprising an encircling wall made of a stiff material to resist distortion and having an inwardly facing channel for receiving the periphery of the flanges of a reel placed within the wall, a rubber-like gasket disposed within the channel for sealing the edge of the reel closed when the wall is closed about the reel, means formed as an integral part of the encircling wall and coplanar with one side of the channel for aligning the reel flanges with the channel when the reel is placed against the means, two breaks provided in the encircling wall substantially 180° apart with the margins of one break secured together by a hinge, a latch including a pivotally mounted plate on one margin of the second break and a shoulder on the other margin of said second break and engaged by the plate to yieldably retain the wall in a closed condition, a closed chamber beneath the plate, and spring means disposed within the chamber and engaging the plate and urging the plate to engage the shoulder.

2. A reel closure as defined in claim 1 further characterized by said means formed as an integral part of the wall comprising an annular flange extending radially inwardly from the channel about the entire channel and having an inner diameter substantially less than the diameter of the reel to be sealed in the closure.

3. A reel closure as defined in claim 2 further characterized by said chamber being defined by a pair of side panels secured to the outside of the wall in the plane of the edges of the wall and extending from said one of the margins to overlie the other margin of the second break when the wall is closed, said chamber also being defined by an end panel secured to the ouside of the wall and joining the ends of the side panels on said one of the margins, the top of said chamber being closed by the plate.

4. A reel closure as defined in claim 3 further characterized by said shoulder being gradually inclined upwardly from the outside of the wall on the side toward said other margin of the second break and being substantially perpendicular to the outside surface on its side away from said second margin, and a rib carried by the plate which rides over the shoulder on the inclined side and locks on the other side when the margins of the second break are moved toward one another as the wall is closed.

References Cited by the Examiner

UNITED STATES PATENTS

| | | | |
|---|---|---|---|
| 1,106,754 | 8/1914 | Troxell | 206—52 |
| 1,488,322 | 3/1924 | Doty | 206—53 |
| 2,191,849 | 2/1940 | Debrie | 206—53 |
| 2,330,278 | 9/1943 | Gordon | 206—59 |
| 3,095,969 | 7/1963 | Morrison | 206—53 |

THERON E. CONDON, *Primary Examiner.*

WILLIAM T. DIXSON, JR., *Examiner.*